US006700735B2

(12) United States Patent
Gregory et al.

(10) Patent No.: US 6,700,735 B2
(45) Date of Patent: Mar. 2, 2004

(54) DISK DRIVE LUBRICANT RESERVOIR SYSTEMS AND LUBRICANTS USED THEREIN

(75) Inventors: Thomas A. Gregory, Campbell, CA (US); Owen Ralph Melroy, Morgan Hill, CA (US); Timothy Martin Reith, San Jose, CA (US); Robert James Waltman, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 41 days.

(21) Appl. No.: 09/916,857

(22) Filed: Jul. 27, 2001

(65) Prior Publication Data

US 2003/0021060 A1 Jan. 30, 2003

(51) Int. Cl.$^7$ .............................................. G11B 33/14
(52) U.S. Cl. .................................................. 360/97.02
(58) Field of Search ........................ 360/97.02, 97.03; 428/65.8, 218, 422, 694 TF, 900; 252/62.54; 427/131

(56) References Cited

U.S. PATENT DOCUMENTS

| | | |
|---|---|---|
| 4,188,434 A | 2/1980 | Loran |
| 4,501,324 A | 2/1985 | Sandiford et al. |
| 4,626,941 A | 12/1986 | Sawada et al. |
| 4,755,469 A | 7/1988 | Showalter et al. |
| 4,758,366 A | 7/1988 | Parekh |
| 4,789,913 A | 12/1988 | Gregory et al. |
| 4,990,283 A | 2/1991 | Visca et al. |
| 5,071,715 A | 12/1991 | Shoji et al. |
| 5,138,506 A | 8/1992 | Beck et al. |
| 5,149,453 A | 9/1992 | Parekh |
| 5,200,867 A | 4/1993 | Albrecht et al. |
| 5,229,899 A | 7/1993 | Brown et al. |
| 5,331,487 A | 7/1994 | Gregory et al. |
| 5,357,782 A | 10/1994 | Henry |
| 5,440,919 A | 8/1995 | Cooper |
| 5,485,327 A | 1/1996 | Yanagisawa |
| 5,494,596 A | 2/1996 | Law et al. |
| 5,559,650 A | 9/1996 | Repphun et al. |

(List continued on next page.)

FOREIGN PATENT DOCUMENTS

| | | | | |
|---|---|---|---|---|
| EP | 302606 A2 | * | 2/1989 | ........... G11B/23/50 |
| JP | 02240828 A | * | 9/1990 | ............ G11B/5/82 |
| JP | 03207021 A | * | 9/1991 | ............ G11B/5/72 |
| JP | 04168621 A | * | 6/1992 | ............ G11B/5/72 |
| JP | 07065536 A | * | 3/1995 | ........... G11B/25/04 |

OTHER PUBLICATIONS

"Vapour deposition of lubricant for disc files—depositing lubricant film of 100 angstroms during disc mfr. to replenish film on disc," Aug. 10, 1992, Research Disclosure, Publication No. RD 340075 A.*

(List continued on next page.)

*Primary Examiner*—William Klimowicz
(74) *Attorney, Agent, or Firm*—Konrad Raynes Victor & Mann, LLP; Alan S. Raynes

(57) ABSTRACT

A lubricating perfluoropolyether (PFPE) composition for lubricating one or more disks in a disk drive system may be formed by providing a first component of PFPE molecules having an aggregate vapor pressure in the range of $1\times10^{-6}$ to $1\times10^{-11}$ atm and a second component of PFPE molecules comprising at least 5% of the total number of molecules of the first component, wherein the second component includes an aggregate vapor pressure lower than that of the first component. The first and second components are mixed together to form a homogeneous composition, which may be in the liquid form. The composition may be introduced into a reservoir in a vapor phase lubricant reservoir system in a disk drive enclosure.

29 Claims, 3 Drawing Sheets

U.S. PATENT DOCUMENTS

| | | |
|---|---|---|
| RE35,370 E | 11/1996 | Henry |
| RE35,395 E | 12/1996 | Henry |
| 5,602,085 A | 2/1997 | Peterson et al. |
| 5,650,563 A | 7/1997 | Cooper et al. |
| 5,741,577 A * | 4/1998 | Yamamoto et al. .......... 428/212 |
| 6,099,937 A * | 8/2000 | Gui et al. .................... 428/141 |
| 2003/0021060 A1 * | 1/2003 | Gregory et al. .......... 360/97.02 |

OTHER PUBLICATIONS

U.S. patent application Ser. No. 09/916,854, filed on Jul. 27, 2001, entitled, "Leak Detection System of Hard Disk Drives With Lubricant Reservoir" invented by B.A. Feliss; D.R. Gillis; T.A. Gregory; S.L. Lee; and V. Raman.

* cited by examiner

DISK DRIVE LUBRICANT RESERVOIR SYSTEMS AND LUBRICANTS USED THEREIN

FIELD OF THE INVENTION

Embodiments of the present invention relate generally to disk drive systems and to lubrication of recording media within the systems.

RELATED ART

Hard disk drive systems typically include one or more rotatable disks having concentric data tracks defined for storing data, a recording head or transducer for reading data from and writing data to the various data tracks on each disk, and an air bearing slider for precisely holding the transducer element in close proximity to a selected track. Lubricants have been placed on the disk surfaces in order to prevent undesirable interactions between the head and the disk.

The head and disk interface in a disk drive can be continuously lubricated by use of a vapor phase lubricant reservoir system. U.S. Pat. No. 4,626,941 describes a system in which a bulk lubricant source is kept at a warmer temperate than the heads and disks. However, this approach led to problems related to the need to prevent excessive bulk-phase lubricant from condensing onto the head and disk surfaces. Other approaches are described in U.S. Pat. No. 4,789,913 to Gregory et al., U.S. Pat. No. 5,229,899 to Brown et al., and U.S. Pat. No. 5,331,487 to Gregory et al., which are each hereby incorporated by reference in their entirety.

SUMMARY

Embodiments include a method for forming a lubricating perfluoropolyether (PFPE) film on one or more disks in a disk drive system, including providing a first component of PFPE molecules having an aggregate vapor pressure in the range of $1 \times 10^{-6}$ to $1 \times 10^{-11}$ atm and a second component of PFPE molecules comprising at least 5% of the total number of molecules of the first component, wherein the second component includes an aggregate vapor pressure lower than that of the first component. The method also includes mixing the first and second components to obtain a homogeneous composition.

Embodiments also include a method for lubricating a rotating disk in a disk drive within an enclosure, comprising positioning a reservoir within the enclosure and spaced a distance from the rotating disk, and filling the reservoir with a single phase liquid comprising a first component of PFPE molecules having an aggregate vapor pressure in the range of $1 \times 10^{-6}$ to $1 \times 10^{-11}$ atm and a second component of PFPE molecules comprising at least 5% of the total number of molecules of the first component, wherein the second component includes an aggregate vapor pressure lower than that of the first component.

Embodiments also include a disk drive system including at least one disk adapted to store data, at least one transducer adapted to read and write data to and from the disk, and a lubricant composition disposed in a reservoir spaced a distance from the disk, the lubricant composition includes a single phase liquid comprising a first plurality of molecules having a first vapor pressure and a second plurality of molecules having a second vapor pressure that is less than the first vapor pressure.

Embodiments also include a lubricant system for use in a disk drive system, including a homogeneous mixture including a first group of perfluoropolyether molecules having a first mean molecular weight and a second group of perfluoropolyether molecules having a second mean molecular weight, wherein the first mean molecular weight is less than the second mean molecular weight.

BRIEF DESCRIPTION OF THE DRAWINGS

Embodiments of the invention are described with reference to the accompanying drawings, which, for illustrative purposes, are schematic and not necessarily drawn to scale.

DETAILED DESCRIPTION

Figure 1:
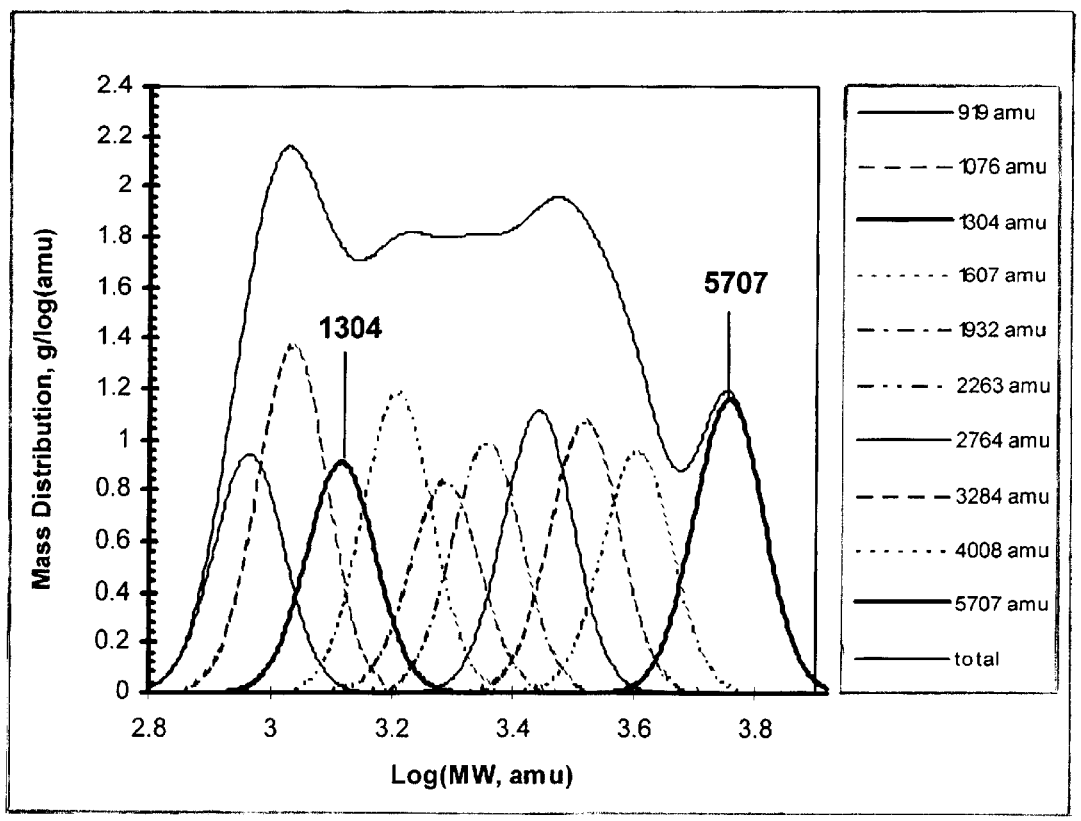
FIG. 1 shows the individual molecular weight distribution for 10 fractions obtained from a perfluoropolyether material by use of $CO_2$ critical phase chromatography.

In general, a bulk supply of liquid or solid lubricant may become a reservoir source when positioned within a disk drive's enclosure. Vapor from this source communicates with the head and disk surfaces so as to provide them with a dense, uniform adsorbate film of lubricant.

Certain disk drive products show a tendency for lubricant on the surfaces of their disks to mimic classical lubricant spin-off. This problem has occurred on particulate magnetic disks, where radial lubricant-flow caused by centrifugal force could lead to a substantial lubricant loss from the inner annular region of a disk's surface (ID) with initial buildup toward the outer region (OD), followed by eventual depletion from the disk's magnetic surface. This has also been observed to a minor extent in analyses of some commercially available drives employing thin-film disk, where the heads are operated at or below 20 nm and above 7200 RPM. In all of these cases on thin-film disks, the mechanism appears to be the result of an acceleration in the rate of radial surface migration of mobile lubricant caused by high air shear between the spinning disks and pseudo-stationary components. Mechanistically, it is thought that the normally compliant lubricant film suffers from localized regions of disruption caused by a high rate of air shear thereby allowing centrifugal force to significantly accelerate the thicker domains of the non-uniform lubricant layer.

Although heads are the largest contributor to air-shear that alone can induce depletion of the lubricant, the suspension(s), elements of the comb, and close proximity of the cover and base casting to disk surfaces are also important contributing factors. The major known factors that may relate to the depletion of lubricant are: (1) lower flying height of the head(s); (2) higher spindle speed (RPM); (3) enhanced smoothness of a disk(s) and in particular the lack of or minimum circumferential disk texture; (4) an increase in the operational temperature of a drive; and (5) a smaller disk spacing that results in a closer separation of the head suspension(s), actuator comb, the drive's cover and base of the casting relative the spinning disk(s). It is observed that a mobile PFPE (perfluoropolyether) lubricant can be more readily depleted as the applied thickness of a PFPE lubricant is increased (all other parameters being held constant). It is also observed that the loss of a given thickness of mobile PFPE lubricant is accelerated by increasing the thickness of the bonded PFPE lubricant (of the same lubricant type; e.g., for the case of PFPE lubricant Z-DOL 4000 Fomblin® perfluoropolyether fluid; Ausimont; Bollate, Italy). Although bonded lubricant is not depleted, it eventually migrates toward the disk's OD via debonding, a phenomenon that is accelerated by temperature, high humidity and the depletion of overlying mobile lubricant. Unfortunately, the mobile phase of any lubricant is tribologically more beneficial than is bonded lubricant. Because many of the factors that accelerate lubricant spin-off are necessary to enable higher aerial density, and to increase the performance of disk drives, there is an apparent impediment to the ultimate advancement of disk drive technology without a solution to lubricant loss.

Hard disk drives may show an increase in tribochemical products and interfacial wear as the total lubricant level on a disk's surface(s) becomes depleted. Data indicates that mobile lubricant is more efficacious in tribology than is the same thickness of bonded lubricant. Thus, it appears that it is advantageous to maintain a lubricant film on the head and disk surfaces in a disk drive over the useful lifetime of the drive.

The head and disk interface in a disk drive can be continuously lubricated by use of a vapor phase lubricant reservoir system as described by U.S. Pat. No. 4,789,913 to Gregory et al., U.S. Pat. No. 5,229,899 to Brown et al., and U.S. Pat. No. 5,331,487 to Gregory et al., which are each hereby incorporated by reference in their entirety. In general, a bulk supply of liquid or solid lubricant becomes the reservoir source when positioned within the disk drive's enclosure. Vapor from this source communicate with the head and disk surfaces so as to provide them with a dense, uniform adsorbate film of lubricant.

A very low-flying head(s) can benefit from a lubrication technology that can continuously maintain a lubricant film at or above 0.6 nm total thickness with more than 0.2 nm of this film being comprised of mobile lubricant.

It has been observed that large linear molecules having finite volatility can form a dense, nearly continuous adsorbed film on interfacial surfaces ranging from a sub-monolayer thickness up to several monolayers of thickness. The resulting adsorbate film is of moderate to high density because a significant number of the atoms that comprise the backbone of most molecules contribute to substantial Van der Waals' bonding with the carbon overcoated surfaces used on heads and thin-film disks. Thus, a volatile PFPE lubricant can result in an adsorbate film that is very similar to that obtained by the common dip-lubrication process typically used in thin-film disk manufacturing, but without the bath-induced irregularities associated with the latter process.

The characteristic thickness of an adsorbate film can be reasonably well approximated by Type I Langmuir adsorption kinetics. (In Type I adsorption, interaction between an adsorbate molecule and the subject surface substantially prevails over the intermolecular interactions.) The tribologically desirable Type I films typically obtain an equilibrium thickness of about 0.6 nm to 1.6 nm depending on the molecular structure of the adsorbate material. For linear molecules above a molecular weight of approximately 150 Daltons, single monolayer adsorption coverage prevails over a wide range of partial-pressure conditions (P/Po of about 0.1 up to approximately 0.95) depending on the surface energy of the COC and the selected lubricant molecule. The low end of this range will usually allow sufficient lubricant adsorbtion so as to approach a monolayer of thickness, but the rate will be slower compared to a higher condition of P/Po. The upper end of the P/Po range provides an accelerated rate of adsorbtion response, but excessive lubricant thickness may result due to Type II adsorption. (Type II adsorption occurs when adsorbate molecules undergo substantial interaction with their neighboring adsorbate molecules typical of films exceeding a monolayer of coverage.) Type II adsorption may be significantly avoided in PFPE materials by the use of any molecular end-group that strongly adsorbs to physical surfaces of heads and disk(s). An effective functional end-group typical involves hydrogen atoms replacing fluorine atoms along with the use of oxygen and/or nitrogen in the backbone chain. The aforementioned Z-DOL 4000 Fomblin® perfluoropolyether fluid is an example including a functional end-group often generally designated by R. The adsorbate thickness of PFPE compounds with functional end-groups is found to be essentially invariant over the wide temperature range that can occur in hard drives usage. Thus, it is possible to continuously maintain a lubricant film at a mean thickness of at least 0.6 nm in a operating drive. Because the process of film maintenance is always dynamically adjusted, any damage imparted to the interface can be quickly repaired by the lubricant reservoir system and any excessive thickness is readily reduced.

A preferred condition for obtaining continuous lubrication in an operational drive is to bathe the interface in lubricant vapor that are always maintained within a somewhat wide P/Po range as previously discussed. From thermodynamic considerations, it can be shown that this condition prevails when the lubricant reservoir supply is generally kept a few degrees cooler than that of the interface. Another method employs any form of capillary containment of the pure lubricant so as to result in the desired P/Po condition. This approach includes adsorption onto a large-surface medium (e.g., activated carbon or other medium with large surface-area or internal volume) that would be in equilibrium with the desired adsorbate film on heads and disks.

Certain embodiments of the present invention relate to the use of homogeneous blended liquids comprised of a volatile perfluoropolyether (PFPE) fluid lubricant material having functional end-groups mixed with an essentially nonvolatile (PFPE) fluid lubricant material in which the former material is miscible. In general, desirable performance is obtained when the essentially nonvolatile fraction of PFPE fluid has identical functional end-groups. In this case, the preferred condition of isothermal mixing may occur together with no volumetric change having occurred so as to allow an estimate the consequential P/Po condition of the blend by use of Raoult's Law. For blends that do not obey Raoult's Law, a desired P/Po condition can be established by a series of graded measurements or through trial and error. The blended PFPE lubricants suppress the vapor pressure of the volatile fraction by an approximate application of Raoult's Law, which states that the vapor pressure of component A, is suppressed by the addition of component B according to the following relationship.

$$P_A = P_A^o [n_A/(n_A + n_B)]$$

where $P_A$ is the reduced vapor pressure, $P_A^o$ is the vapor pressure of pure component A and $n_A$ and $n_B$ are the number of molecules of species A and B respectively. In case of component B having no appreciable vapor pressure, the blended fluids will exhibit a reduced vapor pressure that is adjustable such that $P_A = P/Po = 0.75$ as an example. Thus, the aforementioned blended components can be formulated so as to prevent the adsorbed lubricant film from becoming too thick.

Raoult's Law is generally not strictly obeyed. Necessary conditions for adherence require both components to be miscible, for there to be no volume change on mixing and that the heat of mixing of both components should be zero. Additionally, the molecular cross-section at the surface of the liquid should be essentially equivalent for both components; otherwise a correction for occupational area of the components must be applied. Rarely are all of these physical criteria met, so a departure from this simple mathematical relationship is usually expected. Nevertheless, Raoult's Law has been found to provide a good stating point in formulating a blend of PFPE materials, which can be further, adjusted by actually measuring P/Po and also by assessing reservoir performance in a disks drive.

In certain embodiments it is important to select a higher molecular weight component that is substantially nonvolatile. To assure an attainable P/Po from a given blend, it may be desirable to employ an equivalent polymer backbone in the high molecular weight component as is used for the low molecular weight volatile component, which may include having the same end groups as are used on the volatile lubricant. This concept is shown in the equations below.

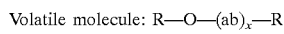

Volatile molecule: R—O—(ab)$_x$—R

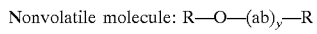

Nonvolatile molecule: R—O—(ab)$_y$—R

In the above equations, y is significantly greater than x so as to establish the required differentiation in volatility. The backbone of the molecule is represented by the molecular units (ab) replicated x or y times, respectively, and E is the molecular end-group of the molecule. The (ab) molecular unit may be any combination of molecular groups. Z-DOL is provided as an example. The —O— generally refers to an ether linkage. In this case the end-group denoted by R is —CH$_2$—OH and (ab) are segments of (CF$_2$—O—)n and (CF$_2$CF$_2$—O—)m, where m and n are integers of comparable magnitude as stated by the manufacturer.

FIG. 1 shows the individual molecular weight distribution for 10 fractions obtained from Z-DOL 2000 by use of CO$_2$ critical phase chromatography.

Figure 2:
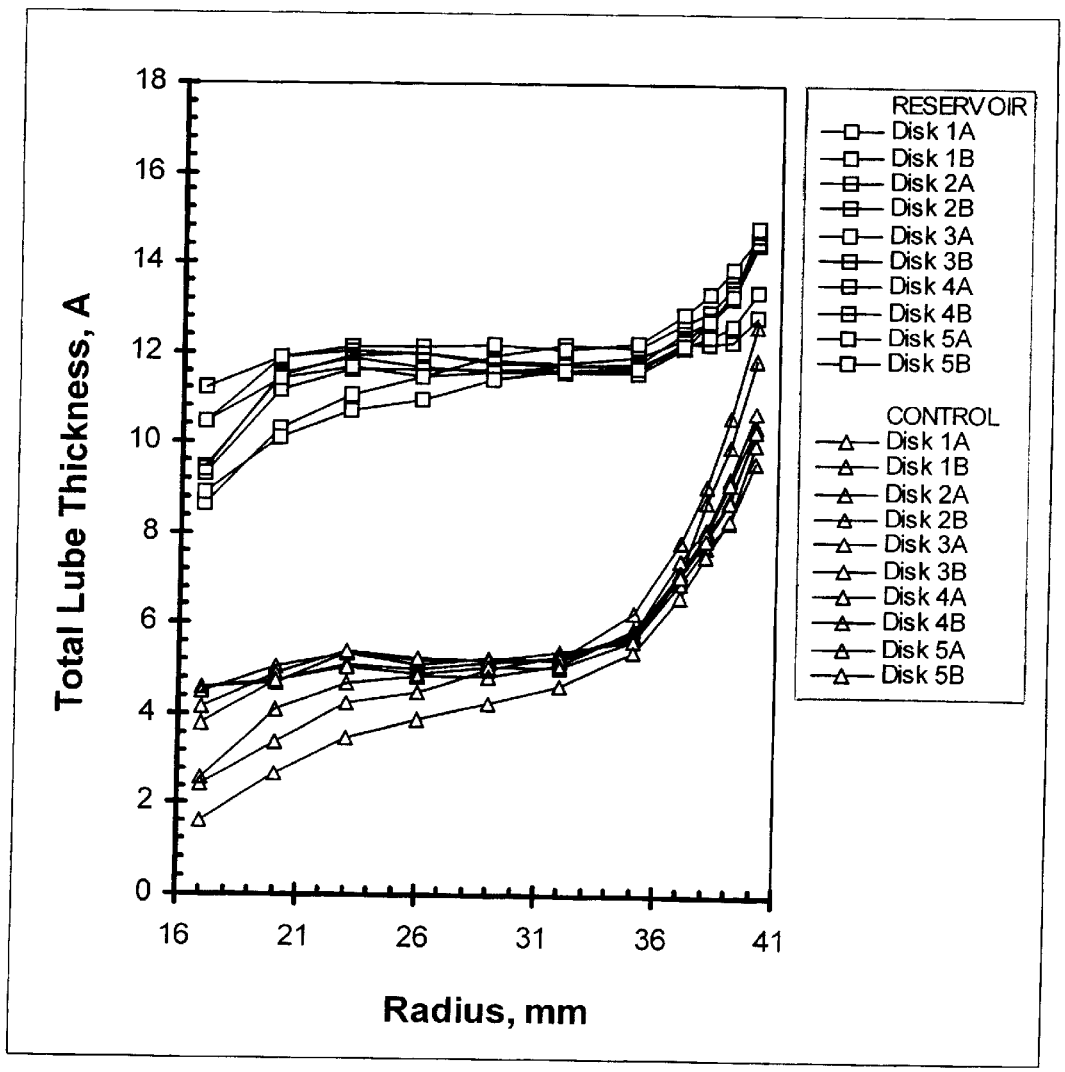
FIG. 2 shows the lubricant reservoir response for a blend of a first molecular weight distribution component combined with a second molecular weight distribution component in accordance with an embodiment of the present invention, compared with a control drive.

FIG. 2 shows the lubricant reservoir response for a blend of a rather narrow molecular weight distribution of Z-DOL centered at 1304 Daltons (volatile component) combined with a similar distribution of Z-DOL centered at 5707 Daltons (essentially nonvolatile). The referenced blend was formulated to approximately provide P/Po=0.8 (roughly an equal-mass blend of the two referenced distributions). In this experiment a matched pair of drives were aggressively operated for several months until the topically applied Z-DOL 4000 lubricant had been redistributed from its original flat radial thickness profile to be compared to that shown in FIG. 2 labeled "control." This conditioning caused the uniformly applied film of Z-DOL 4000 lubricant at 0.9 nm thickness to have become considerably depleted at the ID region of the disks in both of these drives, with an excessive thickness of lubricant forming at the OD region of these disks. The above referenced blended of lubricants (1304 mean amu and 5707 mean amu) was then placed into a felt structure that was installed into one of the two drive to create a lubricant reservoir drive. The other drive served as an experimental control. Both drives were then additionally operated under identical conditions for a 7-day period followed by disassembly for FTIR lubricant thickness analyses shown in FIG. 2. It can be seen that the lubricant reservoir system substantially restored the lubricant that had been lost in the ID region of all disks in this drive. It is also noted that the total lubricant thickness at the OD of the reservoir drive became even thicker due to the fact that the volatile lubricant became adsorbed into the Z-DOL 4000 lubricant that had become inordinately thick at the OD annular region of all disks. Thus the thick, nonvolatile Z-DOL 4000 fluid at the ID region approached equality with the chemical potential of the volatile component in the reservoir source resulting in substantial adsorption in volatile lubricant. The lack of a flat profile resulted from the fact that the redistributed Z-DOL 4000 is not appreciably volatile.

Figure 3:
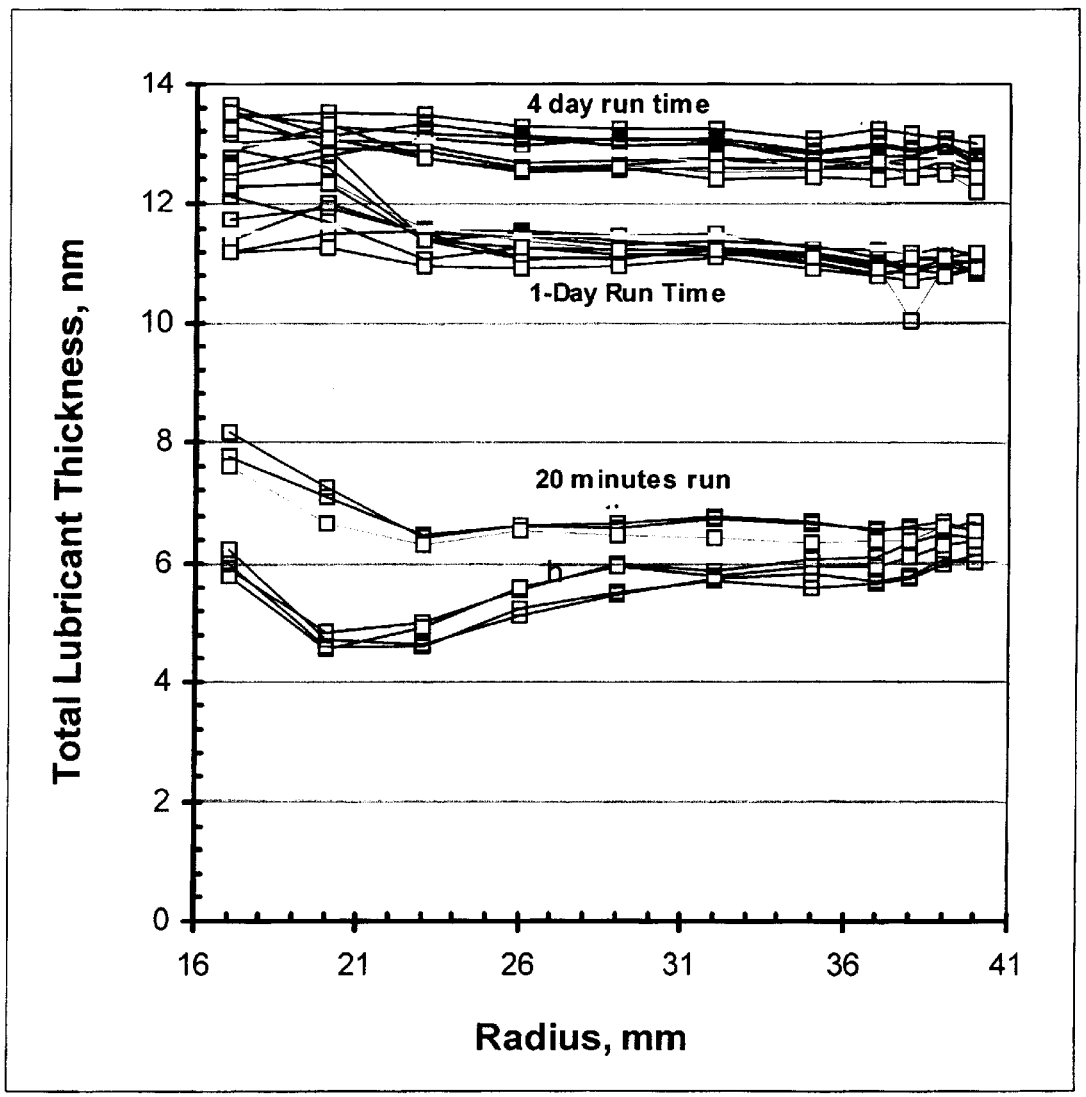
FIG. 3 shows the reservoir response for disk drives operated for various times using a lubricant blend in accordance with embodiments of the present invention.

FIG. 3 shows the reservoir response for three drives operated for 0.3 hours, 1 day and 4 days. In this experiment each file was started with unlubricated disks and with each drive having a reservoir system identical with that described in the experiment relative to FIG. 2. This experiment reveals the initial response time for the reservoir system determined to be 1 Angstrom per hour and a system response time of about 0.5 days (1/e value). Additionally, a flat radial response is observed for the case of only volatile Z-DOL being the adsorbate on the disk. This experiment reveals a flat radial lubricant thickness profile measured at 1.3 nm (13 Angstroms). Results obtained from a fourth file that was operated for 40 days prior to analysis were essentially identical to the thickness response and radial thickness profile obtained for the 4-day run period. In addition, when the disks are pre-lubricated with the volatile Z-DOL 1304 amu fluid, a thickness response essentially identical to the 4-day run time was obtained for analyses conducted over a period of several months.

Because the vapor pressure of the blended fluids will gradually decline as the volatile component is withdrawn, an adequate quantity of this material would be required in a drive to accommodate losses over its lifetime (so P/Po will not become too low).

One aspect of the certain embodiments using blended fluids is described because of the high cost of fractionating a PFPE stock fluid into it various pseudo-monodispersed lubricant components, especially since only about one-fifth of the refined material may be used in embodiments such as the previously described experiments. Realizing that the vapor pressure of every component in a broadly dispersed lubricant material is modified by the environment of its different companion molecules, a generalized partial pressure equation can be derived based on Raoult's law for use as guidance in formulation. The total aggregate vapor pressure of all volatile components in a broadly dispersed lubricant, such as Z-DOL 2000, may be given by the following equation:

$$P_T = \int P_o(mw)D(mw)d(mw),$$

where $$\int D(mw)d(mw)=1;$$

$P_T$ is total vapor pressure of all volatile species, $P^o(mw)$ is the vapor pressure of the pure component of molecular weight mw, D(mw) is the number of molecules at molecular weight mw and d(mw) is the independent variable for integration, which is performed over the entire range of molecular weight present in the lubricant fluid. This computation made for the case of broadly dispersed Z-DOL 2000 yields an aggregate vapor pressure of 4 to 6 times that for the aforementioned blended formulation at effective P/Po of approximately 0.8, which gives a reservoir thickness response nearly identical to that shown in FIG. 2. The higher volatility of this fluid can be readily reduced by vacuum pumping a thin film of this fluid at elevated temperature and/or by blending Z-DOL 2000 with Z-DOL 4000 as an example. This methodology provides an equivalent low cost fluid for reservoir application in a hard drive.

Another aspect of embodiments of the reservoir concept relates to the deliberate departure from the use of an ideal mixture of fluids. Due to the higher molecular weight component of such a mixture progressively occupying more volume as the molecular weight is increased so as to suppress volatility, better economy can be obtained by using multiple pendant end-groups juxtaposed along the length of the molecular backbone. For example, the $CH_2$—OH end-group exhibits significant hydrogen bonding with other similar or identical end-groups. Thus, a single molecule with this functional moiety replicated p times along its backbone could be as efficient in suppression of the volatile component of the lubricant as would p/2 of the high molecular weight component cited in FIG. 1. Further enhancement via hydrogen bonding could be obtained by use of an ether linkage (e.g., end-group —$CH_2$—O—$CH_2CH_2$—OH), or any other variation thereof.

It will, of course, be understood that modifications of the present invention, in its various aspects, will be apparent to those skilled in the art. Other embodiments are possible, their specific features depending upon the particular application. For example, a variety of disk drive configurations, geometries, and components may be may be employed in disk drive systems instead of or in addition to those discussed above.

What is claimed:

1. A method for forming a lubricating perfluoropolyether (PFPE) film for use in a disk drive system, comprising:
   providing a first component of PFPE molecules having an aggregate vapor pressure in the range of $1 \times 10^{-6}$ to $1 \times 10^{-1}$ atm;
   providing a second component of PFPE molecules comprising at least 5% of the total number of molecules of the first component, wherein the second component includes an aggregate vapor pressure lower than that of the first component; and
   mixing the first and second components to obtain a homogeneous composition.

2. A method as in claim 1, wherein the homogeneous composition comprises a liquid.

3. A method as in claim 1, wherein the homogeneous composition includes a plurality of reactive end-groups on at least one end of at a plurality of the PFPE molecules.

4. A method as in claim 3, wherein the reactive end-groups includes at least one $CH_2$ group.

5. A method as in claim 4, wherein the $CH_2$ group comprises one or more ether linkages and a terminal end-group.

6. A method as in claim 5, wherein the terminal end group comprises at least one group selected from a hydroxyl group, an acid group, an amine group, or an aromatic group.

7. A method as in claim 5, wherein a plurality of reactive end groups are positioned on a plurality of molecules of the second component.

8. A method as in claim 4, wherein a plurality of reactive end groups are positioned on molecules of the first component and on molecules of the second component.

9. A method as in claim 1, wherein the first component and the second component each comprise a liquid.

10. A method for using the homogeneous composition of claim 1, comprising:
    providing a disk drive including an enclosure defining an interior volume extending adjacent to a disk surface;
    positioning a quantity of said homogeneous composition within the enclosure; and
    operating the disk drive so that the interior volume is at a temperature in the range of 20 to 65° C. adjacent to the disk surface.

11. A method as in claim 2, wherein first component and the second component are selected from a perfluoropolyether having a mean molecular weight selected from a molecular weight in the group of 1000 amu, 2000 amu, 2500 amu, and 4000 amu.

12. A method as in claim 2, wherein first component and the second component are each refined from a perfluoropolyether having a mean molecular weight selected from a molecular weight in the group of 1000 amu, 2000 amu, 2500 amu, and 4000 amu.

13. A method as in claim 3, wherein a plurality of molecules of the first component and the second component include different functional end groups.

14. A method as in claim 3, wherein the molecules of the first component and the molecules of the second component include the same functional end groups.

15. A method as in claim 1, wherein the second component is at least 10 times less volatile that the first component.

16. A method as in claim 1, wherein the second component is at least 1000 times less volatile that the first component.

17. A method for lubricating a disk in a disk drive within an enclosure, comprising:
    positioning a reservoir within the enclosure and spaced a distance from the rotating disk; and
    filling the reservoir with a single phase liquid comprising a first component of PFPE molecules having an aggregate vapor pressure in the range of $1 \times 10^{-6}$ to $1 \times 10^{-11}$ atm and a second component of PFPE molecules comprising at least 5% of the total number of molecules of the first component, wherein the second component includes an aggregate vapor pressure lower than that of the first component.

18. A disk drive system comprising:
    at least one disk adapted to store data;
    at least one transducer adapted to read and write data to and from the disk;
    a lubricant composition disposed in a reservoir spaced a distance from the disk, the lubricant composition includes a single phase liquid comprising a first plurality of molecules having a first aggregate vapor pressure and a second plurality of molecules having a second aggregate vapor pressure that is less than the first aggregate vapor pressure.

19. A disk drive system as in claim 18, wherein molecules of the first plurality of molecules have a molecular weight that is less than that of the second plurality of molecules.

20. A disk drive system as in claim 18, wherein the first plurality of molecules and second plurality of molecules comprise hydrocarbons.

21. A disk drive system as in claim 18, wherein the first plurality of molecules and second plurality of molecules comprise liquids.

22. A disk drive system as in claim 20, wherein the first plurality of molecules and second plurality of molecules include different functional end groups.

23. A disk drive system as in claim 19, wherein the first plurality of molecules and second plurality of molecules include the same functional end groups.

24. A disk drive system as in claim 19, wherein the first plurality of molecules and second plurality of molecules comprise perfluoropolyether materials.

25. A computer system comprising:
- a disk drive including a disk drive enclosure and at least one disk therein;
- a reservoir disposed in the disk drive enclosure and spaced a distance from the disk;
- a disk drive lubricant composition disposed in the reservoir and including a first plurality of molecules and a second plurality of molecules, wherein the second plurality of molecules has a vapor pressure that is less than that of the first plurality of molecules; wherein the first plurality of molecules and the second plurality of molecules each comprise perfluoropolyether materials; and
- wherein the disk drive lubricant composition disposed in the reservoir comprises a single-phase liquid blend including the first plurality of molecules and the second plurality of molecules.

26. A computer system as in claim 25, wherein the second plurality of molecules have a greater mean average molecular weight than that of the first plurality of molecules.

27. A lubricant system for use in a disk drive system, comprising:
- a homogeneous liquid mixture comprising a first group of perfluoropolyether molecules having a first mean molecular weight and a second group of perfluoropolyether molecules having a second mean molecular weight, wherein the first mean molecular weight is less than the second mean molecular weight; and
- a reservoir for housing a supply of the homogeneous liquid mixture within the disk drive system.

28. A lubricant system as in claim 27, wherein the first group of perfluoropolyether molecules includes an aggregate vapor pressure in the range of $1 \times 10^{-6}$ to $1 \times 10^{-11}$ atm, and the second group of perfluoropolyether molecules includes an aggregate vapor pressure lower than that of the first group.

29. A lubricant system as in claim 28, wherein the second group of perfluoropolyether molecules comprises a total number of molecules that is at least 5% of the total number of molecules of the first group of perfluoropolyether molecules.

* * * * *